(12) United States Patent
Viano et al.

(10) Patent No.: US 6,938,918 B2
(45) Date of Patent: Sep. 6, 2005

(54) FRONTAL AIR BAG SYSTEM

(75) Inventors: David Charles Viano, Bloomfield Hills, MI (US); James Lloyd Webber, Shelby Township, Macomb County, MI (US); Philip Wendel Hopf, Dayton, OH (US); Minoo Jaswantlal Shah, Farmington Hills, MI (US); Axel Kaiser, Maintal (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/363,062

(22) Filed: Jul. 29, 1999

(65) Prior Publication Data

US 2001/0040364 A1 Nov. 15, 2001

Related U.S. Application Data

(63) Continuation-in-part of application No. 09/065,912, filed on Apr. 24, 1998, now Pat. No. 6,073,960.

(51) Int. Cl.$^7$ .............................................. B60C 21/22
(52) U.S. Cl. ................................................... 280/730.1
(58) Field of Search ........................... 280/730.1, 730.2, 280/728.2

(56) References Cited

U.S. PATENT DOCUMENTS

| | | | |
|---|---|---|---|
| 2,834,606 A | 5/1958 | Bertrand | 280/150 |
| 2,834,609 A | 5/1958 | Bertrand | 280/150 |
| 3,865,433 A | 2/1975 | Stafford | 297/488 |
| 5,044,663 A | 9/1991 | Seizert | 280/730 |
| 5,308,108 A * | 5/1994 | Rion | 280/729 |
| 5,362,097 A | 11/1994 | Barske | 280/730 R |
| 5,575,497 A | 11/1996 | Suyama et al. | 280/730.1 |
| 5,762,367 A | 6/1998 | Wolanin | |
| 5,865,462 A | 2/1999 | Robins et al. | 280/730.2 |
| 5,924,723 A | 7/1999 | Brantman et al. | 280/730.2 |
| 6,050,596 A * | 4/2000 | Boerger | 280/729 |
| 6,073,960 A * | 6/2000 | Viano et al. | 280/730.1 |
| 6,123,355 A * | 9/2000 | Sutherland | 280/728.2 |
| 6,308,983 B1 | 10/2001 | Sinnhuber | |
| 6,371,517 B1 | 4/2002 | Webber et al. | |
| 6,409,213 B2 | 6/2002 | Webber et al. | |

FOREIGN PATENT DOCUMENTS

| | | |
|---|---|---|
| FR | 2227979 A | 11/1974 |
| JP | 4-110252 | 4/1992 |

* cited by examiner

*Primary Examiner*—Tony Winner
(74) *Attorney, Agent, or Firm*—Scott A. McBain

(57) ABSTRACT

A frontal air bag system for a vehicle including an inflator mounted to vehicle structure and an air bag operatively connected to the inflator and mounted to a pillar of the vehicle. The frontal air bag system also includes a trim molding covering the air bag and mounted to the pillar. The air bag, inflated by the inflator, is extended downward and sideways in front of an occupant seated in the vehicle.

20 Claims, 3 Drawing Sheets

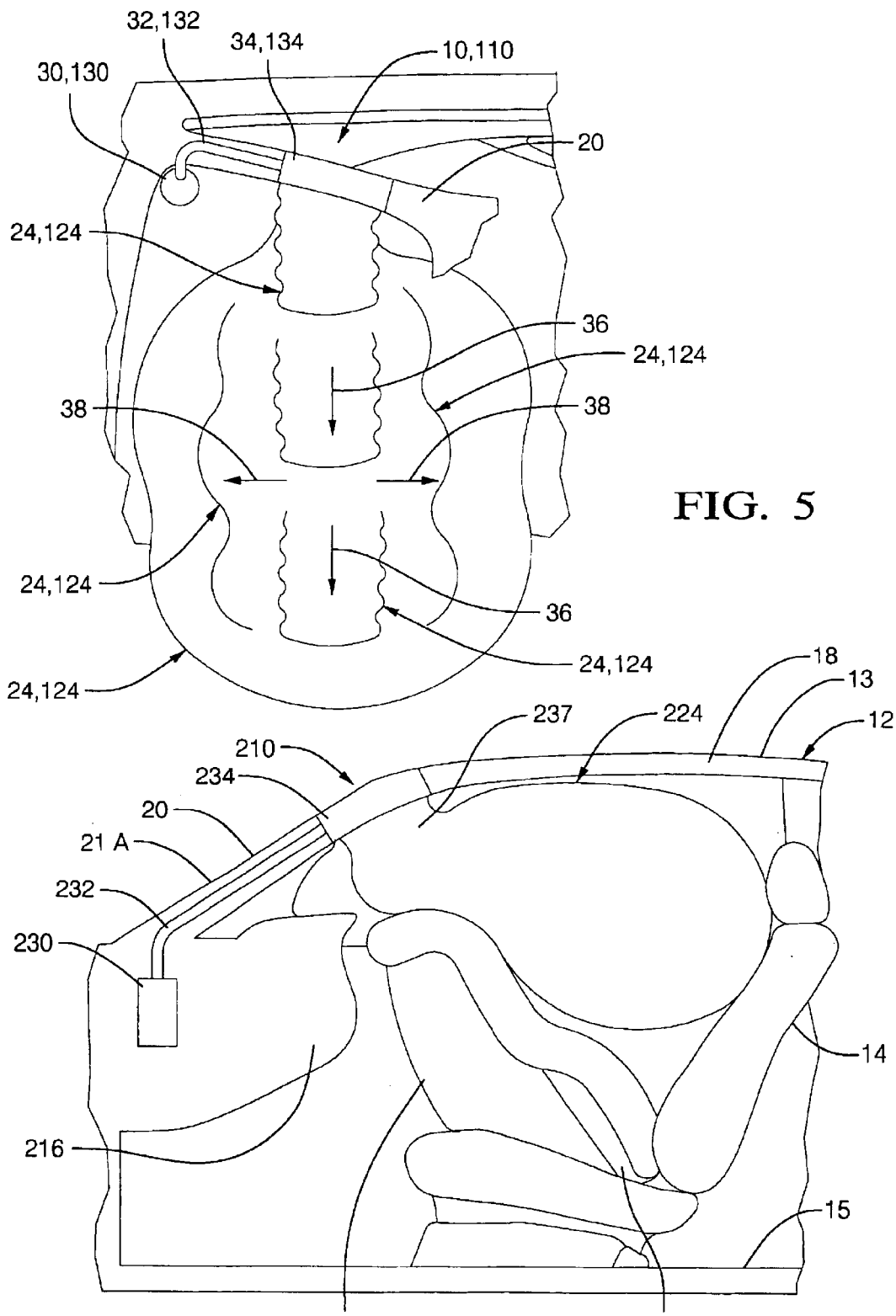

FRONTAL AIR BAG SYSTEM

CROSS-REFERENCE TO RELATED APPLICATION (S)

The present application is a continuation of application Ser. No. 09/363,062, filed Jul. 29, 1999, which is a continuation-in-part of application Ser. No. 09/065,912, filed Apr. 24, 1998, now U.S. Pat. No. 6,073,960 and entitled "AIR BAG ASSEMBLY".

TECHNICAL FIELD

The present invention relates generally to inflatable restraint systems for vehicles and, more particularly, to a frontal air bag system for a vehicle.

BACKGROUND OF THE INVENTION

It is known to provide an inflatable restraint system in a vehicle to augment protection traditionally afforded vehicle occupants through the use of seat belts and other components of in an interior of the vehicle. In some vehicles, the inflatable restraint system may be an air bag system disposed within an interior or occupant compartment in the vehicle in close proximity to either a driver occupant or one or more passenger occupants. Typically, the air bag system includes an air bag module attached to vehicle structure and having an air bag for deployment through an opening in a cover to extend into an occupant compartment of the vehicle. The deployed air bag restrains movement of the occupant to help protect the occupant during a collision.

It is also known to provide frontal air bags for forward protection of an occupant. The frontal air bag is typically provided in a vehicle steering wheel for protection of the driver occupant and another air bag is provided in the instrument panel for protection of the passenger occupant. As a result, many different parts are needed for the driver and passenger frontal air bags because they are currently in separate modules on the steering wheel and instrument panel.

Further, these frontal air bags are packaged directly in front of the occupants to assure that the air bags are between the occupant and the vehicle interior. As a result, it has been proposed to provide additional occupant sensing and analysis electronics to control deployment of the frontal air bags in cases of out-of-position occupants and rear-facing child seats.

It is desirable to provide a frontal air bag that provides frontal protection while not deplying in a directly rearward direction. It is also desirable to provide a frontal air bag for an occupant in a vehicle that helps to reduce energy imparted to out-of position occupants and rear-facing child seats. It is further desirable to provide to deploy a frontal air bag from a pillar of a vehicle body.

SUMMARY OF THE INVENTION

It is, therefore, one object of the present invention to provide a frontal air bag system that removes an air bag from a steering wheel and instrument panel in a vehicle.

It is another object of the present invention to provide a frontal air bag system that deploys downward into position and not rearwardly towards the occupant.

To achieve the foregoing objects, the present invention is a frontal air bag system for a vehicle including an inflator mounted to vehicle structure and an air bag operatively connected to the inflator and mounted to a pillar of the vehicle. The frontal air bag system also includes a trim molding covering the air bag and mounted to the pillar. The air bag, inflated by the inflator, is extended downward and sideways in front of an occupant seated in the vehicle.

One advantage of the present invention is that the frontal air bag system provides an air bag stored behind a trim molding for a pillar in a vehicle. Yet another advantage of the present invention is that the frontal air bag deploys downwardly and sidewardly into position and not rearwardly towards the occupant. Still another advantage of the present invention is that the frontal air bag system is removed from the steering wheel and instrument panel and can be used on the driver and passenger side of the vehicle and for front and rear seated occupants. A further advantage of the present invention is that the frontal air bag system provides tailored shapes for the driver side air bag since the requirement for symmetry for a rotating wheel is eliminated. Yet a further advantage of the present invention is that the frontal air bag system commonizes the parts needed for the driver and passenger frontal air bags and simplifies installation for right-hand to left-hand drive vehicles. Still a further advantage of the present invention is that the need for extra sensors and electronics may be reduced.

Other objects, features and advantages of the present invention will be readily appreciated, as the same becomes better understood after reading the subsequent description taken in conjunction with the accompanying drawings.

BRIEF DESCRIPTION OF THE DRAWINGS

FIG. 5 is a plan view of the frontal air bag system of FIGS. 1 and 3 illustrating deployment of an air bag.

FIG. 6 is a side elevational view of a frontal air bag system, according to the present invention, illustrated in operational relationship with a rear-facing infant seat and vehicle.

DESCRIPTION OF THE PREFERRED EMBODIMENT

Figure 1:
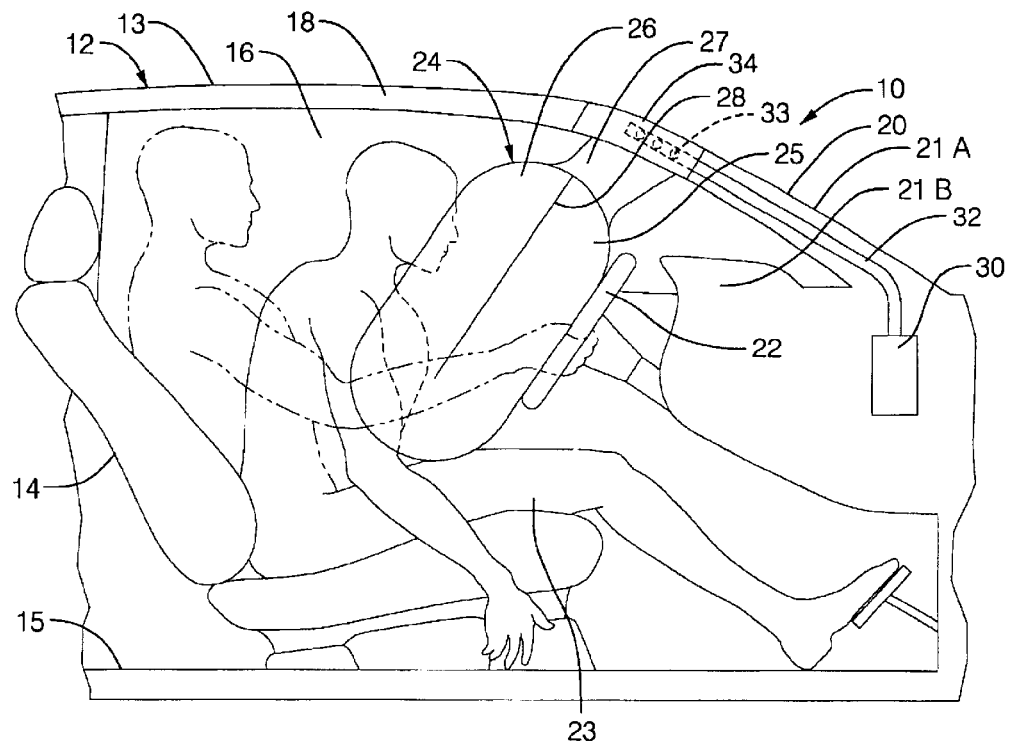
FIG. 1 is a side elevational view of a frontal air bag system, according to the present invention, illustrated in operational relationship with a driver occupant and vehicle.
Figure 2:
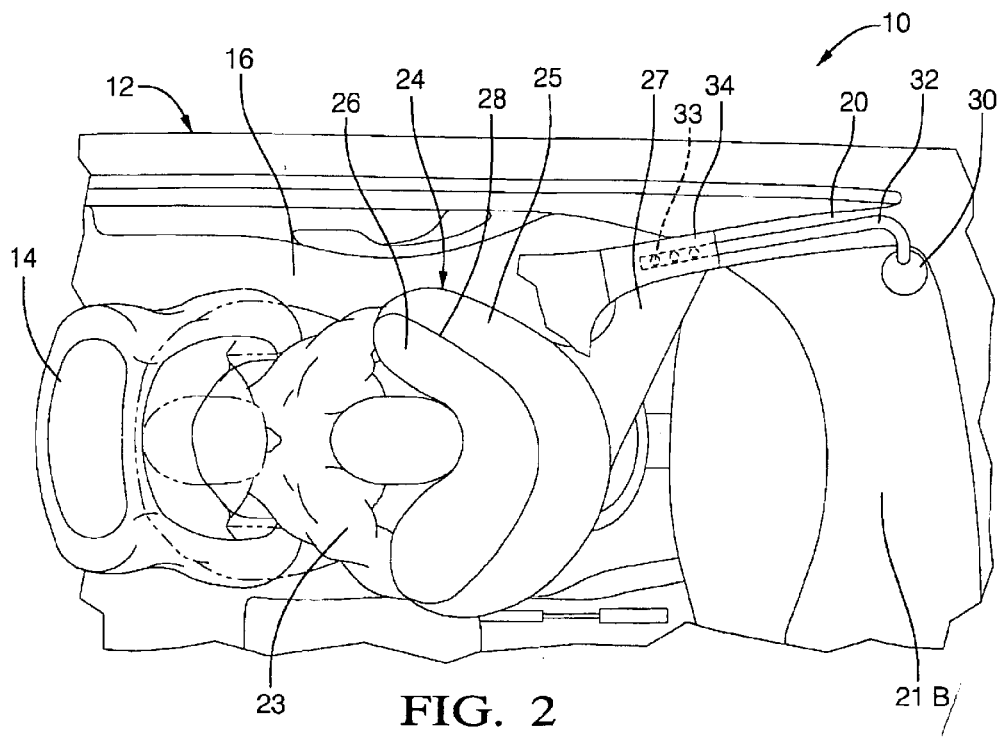
FIG. 2 is a plan view of the frontal air bag system, occupant and vehicle of FIG. 1.

Referring to the drawings and in particular FIGS. 1 and 2, one embodiment of a frontal air bag system 10, according to the present invention, is shown for a vehicle (partially shown), generally indicated at 12. The vehicle 12 includes a vehicle body 13 and a seat 14 mounted by suitable means to vehicle structure 15 such as a floor pan in an occupant compartment 16 of the vehicle body 13. In this embodiment, the seat 14 is a front seat of the vehicle 12. The vehicle body 13 includes a roof rail 18 extending longitudinally along each side thereof. The vehicle body 13 also includes an A-pillar 20 extending forwardly and downwardly at an angle from each roof rail 18. The vehicle body 13 may also include a B-pillar (not shown) and a C-pillar (not shown). The vehicle 12 includes a windshield 21a and an instrument panel 21b extending laterally between the A-pillars 20 and connected to the vehicle body 13. The vehicle 12 also includes a steering wheel 22 extending rearwardly from the instrument panel 21b on a driver occupant side of the vehicle 12. An occupant 23 is typically seated in the seat 14 in a normal driving position as indicated by phantom lines and is spaced rearwardly from the steering wheel 22. It should be appreciated that, except for the frontal air bag system 10, the vehicle 12 is conventional and known in the art.

Referring again to FIGS. 1 and 2, the frontal air bag system 10, according to the present invention, includes an air bag, generally indicated at 24, for deployment and inflation between the steering wheel 22 and the occupant 23. The air bag 24 includes one or more panels constructed to form a general or specific shape. In the embodiment illustrated, the air bag 24 is circular in shape, but may be rectangular or spherical in shape. The air bag 24 includes a front or first panel 25 and a rear or second panel 26. The front panel 25 and rear panel 26 are generally circular in shape. As illustrated, the air bag 24 also includes a neck or connecting portion 27 connected to the front panel 25 and rear panel 26. The connecting portion 27 is generally cylindrical in shape when it is inflated. The connecting portion 27 also includes an inflator aperture (not shown) centrally located therein for a function to be described. The front panel 25, rear panel 26 and connecting portion 27 are connected or attached together by suitable means such as stitching with a thread material 28 along the perimeter thereof. The front panel 25, rear panel 26 and connecting portion 27 are preferably made of a fabric material such as nylon or polyester as is known in the art. It should be appreciated that the air bag 24 could also be one panel sewn to shape or a one-piece woven bag.

The frontal air bag system 10 includes an inflator 30 operatively connected to the air bag 22 for inflating the air bag 22. The inflator 30 is of a suitable type such as a cylindrical hybrid type that is conventional and known in the art. The inflator 30 may be mounted intimately with the air bag 24 or in a location remote from the air bag 24 such as the instrument panel 21b. The inflator 30 is connected by suitable means (not shown) to vehicle structure such as the vehicle body 13 or instrument panel 21b. The inflator 30 is connected by suitable means such as wires (not shown) to a source of power (not shown) for activating the inflator 30. It should be appreciated that the inflator 30 is activated by the source of power to expel a gas under pressure.

The frontal air bag system 10 may also include a diffuser 32 extending axially from the inflator 30 and through a pillar of the vehicle body 13 when the inflator 30 is mounted in a remote location from the air bag 24. In the embodiment illustrated, the diffuser 32 extends through the A-pillar 20 and the inflator aperture to be at least partially disposed within the air bag 24. The connecting portion 27 of the air bag 24 is secured to the end of diffuser 32 by suitable means such as a clamp (not shown), which is conventional and known in the art. The diffuser 32 is a generally cylindrical tube or pipe including a plurality of apertures 33 in the end or along a length thereof to allow the gas to pass therethrough.

The frontal air bag system 10 also includes a trim molding 34 attached to a pillar of the vehicle body 13 for covering and housing the air bag 24. In the embodiment illustrated, the trim molding is attached to the A-pillar 20. The trim molding 34 is made of a suitable material such as plastic and extends laterally and longitudinally. The trim molding 34 is attached by suitable means such as fasteners (not shown) to the A-pillar 20. It should be appreciated that the trim molding 34 may be attached to the A-pillar 20 by other suitable means such as an adhesive or sonic welding.

Figure 3:
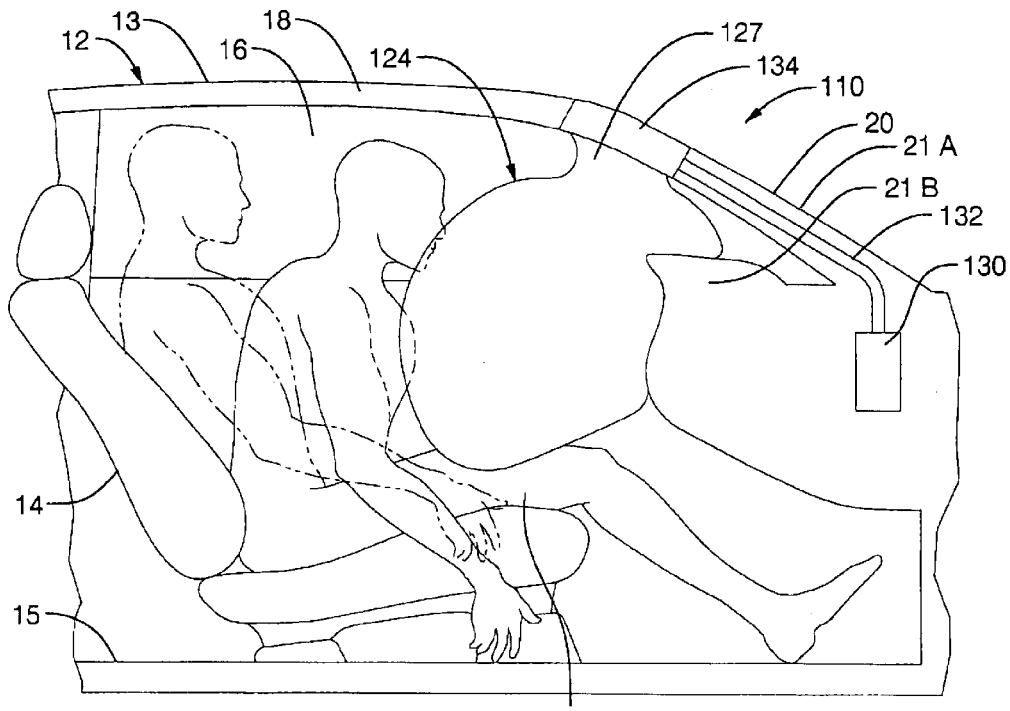
FIG. 3 is a side elevational view of a frontal air bag system, according to the present invention, illustrated in operational relationship with a passenger occupant and vehicle.
Figure 4:
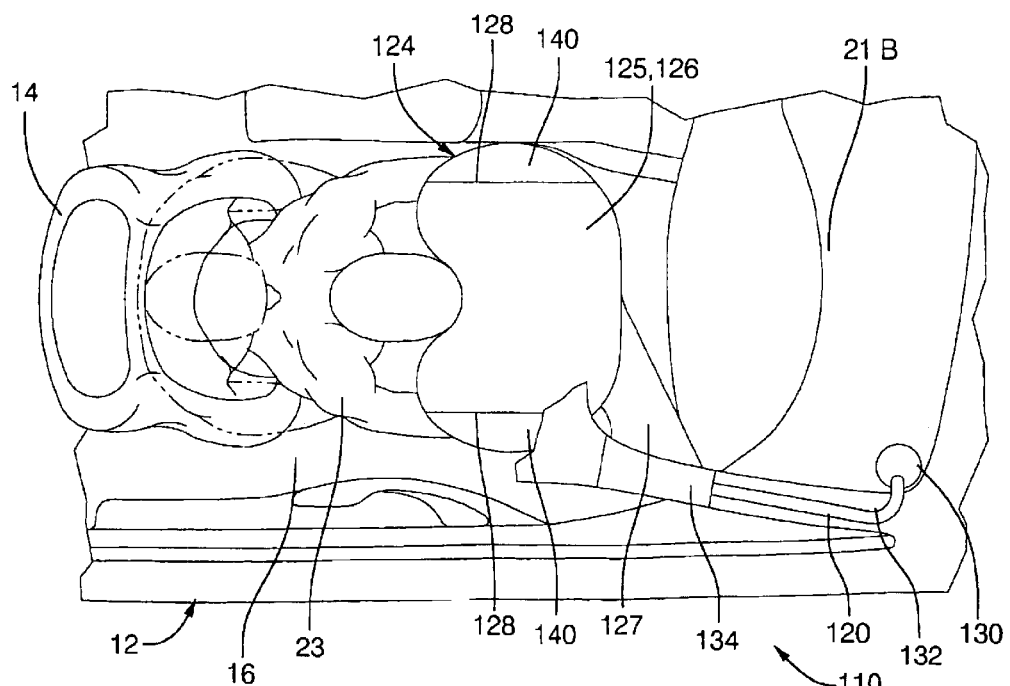
FIG. 4 is a plan view of the frontal air bag system, occupant and vehicle of FIG. 3.

Referring to FIGS. 3 and 4, another embodiment 110, according to the present invention, of the frontal air bag system 10 is shown. Like parts to the frontal air bag system 10 has like reference numerals increased by one hundred (100). The frontal air bag system 110 is illustrated for a passenger occupant side of the vehicle 12. The air bag 124 includes one or more panels constructed to form a general or specific shape. In the embodiment illustrated, the air bag 124 is rectangular in shape, but may be circular or spherical in shape. The air bag 124 includes a front or first panel 125 and a rear or second panel 126. The air bag 124 may also include one or more side panels 140 connected to the front panel 125 and the rear panel 126. The front panel 125, rear panel 126 and side panels 140 are generally rectangular in shape. It should be appreciated that the air bag 124 could also be one panel sewn to shape or a one-piece woven bag.

As illustrated, the air bag 124 also includes a neck or connecting portion 127 connected to one of the side panels 140, preferably the outboard side panel 140. The connecting portion 127 is generally cylindrical in shape when it is inflated. The connecting portion 127 also includes an inflator aperture (not shown) centrally located therein for a function to be described. The front panel 125, rear panel 126, side panels 140 and connecting portion 127 are connected or attached together by suitable means such as stitching with a thread material 128 along the perimeter thereof. The operation of the frontal air bag system 110 is similar to the frontal air bag system 10, except that the air bag 124 is positioned between the occupant 23 and vehicle structure such as the instrument panel 21b and windshield 21a.

In operation, the frontal air bag system 10, 110 has the air bag 24, 124 mounted on a pillar of the vehicle body 13 such as the A-pillar, B-pillar or C-pillar. In the embodiment illustrated, the air bag 24,124 is mounted on the A-pillar 20 in a folded stowed position behind the trim molding 34,134. When the vehicle experiences a collision-indicating condition of at least a predetermined threshold level, the inflator 30,130 is activated and a gas is expelled into the air bag 24,124. Gas enters the air bag 24, 124 and the connecting portion 27,127 is inflated behind the trim molding 34,134 to move the trim molding 34,134 inboard to disengage the A-pillar 20 as illustrated in FIG. 5. The air bag 24,124 extends through an opening between the trim molding 34,134 and A-pillar 20. The air bag 24,124 deploys inboard and downwardly into the occupant compartment 16 of the vehicle 12 in a sideways or cross car direction as indicated by the arrows 36. The air bag 24,124 is filled further with gas to a restraint depth in a fore/aft direction as indicated by the arrows 38.

For a driver occupant, the air bag 24 is deployed between the occupant 23, steering wheel 22 and windshield 21a as illustrated in FIGS. 1 and 2. The occupant 23 engages the air bag 24 during impact in an impact position as indicated by the solid lines in FIGS. 1 and 2.

For a passenger occupant, the air bag 124 is deployed between the occupant 23, instrument panel 21 and windshield 21a as illustrated in FIGS. 3 and 4. The occupant 23 engages the air bag 124 during impact in an impact position as indicated by the solid lines in FIGS. 3 and 4.

Referring to FIG. 6, yet another embodiment 210, according to the present invention, of the frontal air bag system 10 is shown. Like parts to the frontal air bag system 10 has like reference numerals increased by two hundred (200). As illustrated, a rear-facing child seat 242 is restrained by a belt 244 in the seat 14 on a passenger side of the vehicle 12. The operation of the frontal air bag system 210 is similar to the frontal air bag system 10, except for the operation of the air bag 224 which is deployed into position between the rear-facing child seat 242 and the seat 14 of the vehicle 12.

Optionally, the frontal air bag system 10,110,210 may include a tether (not shown) attached to the trim molding 34,134,234 to control the unfolding, inflation, and positioning of the air bag 24,124,224.

Accordingly, the frontal air bag system 10,110,210 moves the location of the stored air bag 24,124,224 behind the trim molding 34,134,234 for a pillar 20. The occupant, in the direct path of deployment of the air bag 24,124,224, causes the air bag 24,124,224 to be deflected to the side, behind or front of the occupant to an area where space is available. The air bag 24,124,224 fills and helps to reduce energy imparted to the occupant. By inflating in front of the steering wheel 22 or instrument panel 21*b*, the same frontal air bag system can be used on the driver and passenger side. Further, the frontal air bag system 10,110,210 can help to protect the occupant from striking the pillar of the vehicle body 13 and other vehicle structure resulting from front, side, or angular impact on the vehicle 12.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A frontal air bag system for a vehicle comprising:

an inflator adapted to be mounted to a vehicle structure;

a diffuser connected to said inflator and adapted to extend along a pillar of the vehicle;

a frontal air bag operatively connected to said diffuser and adapted to be mounted solely to the pillar; and a trim molding covering said frontal air bag and adapted to be mounted to the pillar, wherein said frontal air bag is inflated by said inflator via said diffuser to extend downward and sideways directly in front of an occupant seated in the vehicle and said trim molding is displaced during deployment of said frontal air bag.

2. A frontal air bag system as set forth in claim 1 wherein said air bag is mounted to the pillar on a driver side of the vehicle.

3. A frontal air bag system as set forth in claim 1 wherein said air bag is mounted to the pillar on a passenger side of the vehicle.

4. A frontal air bag system as set forth in claim 1 wherein said air bag is either one of a generally circular, rectangular and spherical shape.

5. A frontal air bag system as set forth in claim 1 wherein said air bag comprises at least one panel to form a specific shape.

6. A frontal air bag system as set forth in claim 5 wherein said air bag includes a neck portion connected to said at least one panel.

7. A frontal air bag system as set forth in claim 6 wherein said neck portion is operatively connected to said diffuser.

8. A frontal air bag system for a vehicle comprising:

an inflator adapted to be remotely mounted to vehicle structure;

a diffuser adapted to be connected to said inflator and adapted to extend along a pillar of the vehicle;

a frontal air bag adapted to be mounted solely to the pillar and having at least one panel and a neck portion connected to said at least one panel, said neck portion being operatively connected to said diffuser; and a trim molding covering said frontal air bag and adapted to be mounted to the pillar, wherein said frontal air bag is inflated by said inflator via said diffuser to extend downward and sideways directly in front of an occupant seated in the vehicle and said trim molding is displaced during deployment of said frontal air bag.

9. A frontal air bag system for a vehicle having a front pillar, comprising:

a frontal air bag mounted to said front pillar of the vehicle; and wherein said frontal air bag is inflated to extend downward and sideways directly in front of an occupant seated in the vehicle.

10. A frontal air bag system as set forth in claim 9 including an inflator adapted to be mounted to a vehicle structure and operatively connected to said frontal air bag.

11. A frontal air bag system as set forth in claim 9 including a trim molding covering said frontal air bag and adapted to be mounted to the pillar, wherein said trim molding is displaced during deployment of said frontal air bag.

12. A frontal air bag system as set forth in claim 9 wherein said frontal air bag comprises at least one panel to form a specific shape.

13. A frontal air bag system as set forth in claim 9 wherein said frontal air bag includes a neck portion connected to said at least one panel.

14. A frontal air bag system as set forth in claim 10 including a diffuser attached to said inflator and said frontal air bag.

15. A frontal air bag system as set forth in claim 14 wherein said diffuser is a hollow tube having a plurality of apertures at least partially disposed within said frontal air bag.

16. A frontal air bag system as set forth in claim 10 wherein said inflator is adapted to be remotely located on the vehicle structure from the pillar.

17. A frontal air bag system as set forth in claim 16 including a diffuser connected to said inflator and extending along the pillar to said frontal air bag.

18. A frontal air bag system as set forth in claim 9 wherein said frontal air bag is adapted to be mounted to the pillar on a driver side of the vehicle.

19. A frontal air bag system as set forth in claim 9 wherein said frontal air bag is adapted to be mounted to the pillar on a passenger side of the vehicle.

20. A frontal air bag system as set forth in claim 9 wherein said frontal air bag is one of a group comprising a generally rectangular, circular, and spherical shape.

* * * * *